United States Patent
Aoki et al.

(10) Patent No.: US 12,128,777 B2
(45) Date of Patent: Oct. 29, 2024

(54) VEHICLE, AND CONTROL METHOD FOR VEHICLE

(71) Applicant: TOYOTA JIDOSHA KABUSHIKI KAISHA, Toyota (JP)

(72) Inventors: Yuya Aoki, Miyoshi (JP); Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 17/881,970

(22) Filed: Aug. 5, 2022

(65) Prior Publication Data

US 2023/0107766 A1 Apr. 6, 2023

(30) Foreign Application Priority Data

Oct. 4, 2021 (JP) ................................ 2021-163347

(51) Int. Cl.
*B60L 53/16* (2019.01)

(52) U.S. Cl.
CPC ........... *B60L 53/16* (2019.02); *B60L 2270/32* (2013.01)

(58) Field of Classification Search
CPC .............................. B60L 53/16; B60L 2270/32
See application file for complete search history.

(56) References Cited

U.S. PATENT DOCUMENTS

| | | | | |
|---|---|---|---|---|
| 8,676,401 B2 * | 3/2014 | Asada | ..................... | B60L 53/66 701/2 |
| 11,279,254 B2 * | 3/2022 | Ando | ..................... | B60L 53/16 |
| 2009/0082916 A1 * | 3/2009 | Tanaka | ..................... | B60L 53/60 70/237 |
| 2014/0179141 A1 * | 6/2014 | Kojima | ................... | B60L 53/11 439/296 |
| 2016/0257211 A1 * | 9/2016 | Kimura | ................... | B60L 53/16 |
| 2020/0094703 A1 | 3/2020 | Ohtomo | | |
| 2020/0217108 A1 | 7/2020 | Kinomura | | |
| 2020/0318399 A1 * | 10/2020 | Ueki | ......................... | G07C 5/08 |
| 2022/0243520 A1 * | 8/2022 | Aoki | ........................ | E05F 15/73 |
| 2023/0373293 A1 * | 11/2023 | Kaneko | ................... | B60K 15/05 |
| 2024/0075824 A1 * | 3/2024 | Shibata | .............. | H01R 13/7172 |
| 2024/0140194 A1 * | 5/2024 | Kaneko | ................... | B60K 15/05 |
| 2024/0157783 A1 * | 5/2024 | Kaneko | ................... | B60K 15/05 |
| 2024/0157817 A1 * | 5/2024 | Suzuki | ..................... | B60L 50/64 |
| 2024/0159093 A1 * | 5/2024 | Kaneko | ................... | B60K 15/05 |
| 2024/0159095 A1 * | 5/2024 | Sha | ........................ | E05F 15/622 |

FOREIGN PATENT DOCUMENTS

JP 2020-114040 A 7/2020

* cited by examiner

*Primary Examiner* — Erez Gurari
(74) *Attorney, Agent, or Firm* — Sughrue Mion, PLLC

(57) ABSTRACT

A vehicle includes a first power receiving port, a first lid provided at the first power receiving port, a first lid lock device configured to switch the first lid between locked and unlocked states, and a controller configured to control the first lid lock device to a locked or unlocked state. When an entry door of the vehicle is locked while the first lid is open, the controller is configured to set the first lid lock device to the unlocked state until the first external charging is started, set the first lid lock device to the locked state when the first external charging is started, and set the first lid lock device to the unlocked state when the first external charging completes.

6 Claims, 6 Drawing Sheets

VEHICLE, AND CONTROL METHOD FOR VEHICLE

CROSS-REFERENCE TO RELATED APPLICATION

This application claims priority to Japanese Patent Application No. 2021-163347 filed on Oct. 4, 2021, incorporated herein by reference in its entirety.

BACKGROUND

1. Technical Field

The disclosure relates to a vehicle, and a control method for a vehicle and, more specifically, to a vehicle, and a control method for a vehicle, configured to be able to perform external charging for charging an in-vehicle electrical storage device from a charging facility provided outside the vehicle.

2. Description of Related Art

Japanese Unexamined Patent Application Publication No. 2020-114040 (JP 2020-114040 A) describes a vehicle configured to be able to perform external charging. The vehicle is capable of operating a lid lock device and a connector lock device in synchronization with a door lock device, and relays used to switch between supply and interruption of operating power to each of the lock devices are integrated (see JP 2020-114040 A).

SUMMARY

A charging facility may include a connector lock device that sets connection of a charging connector of the charging facility with an inlet of the vehicle to a locked state. The charging facility equipped with the connector lock device releases connection of the charging connector with the inlet when external charging completes. Thus, a user is able to remove the charging connector from the inlet.

Here, when the user leaves from the vehicle during external charging, the user generally locks doors. After that, if external charging is complete when the user is back to the vehicle, the user removes the charging connector from the inlet and closes a lid.

However, as in the case of, for example, the vehicle described in JP 2020-114040 A, if a lid lock device is set to a locked state in synchronization with a door lock device, the user is not able to close the lid even when the user attempts to close the lid because the lid lock device is in the locked state. To set the lid lock device to an unlocked state, the doors need to be unlocked, so there is room for improvement from the viewpoint of user convenience.

The disclosure improves user convenience in external charging using a charging facility equipped with a connector lock device.

A first aspect of the disclosure provides a vehicle. The vehicle is configured to be able to perform first external charging to charge an in-vehicle electrical storage device with electric power supplied from a first charging facility provided outside the vehicle. The vehicle includes a first power receiving port configured to be able to connect with a first connector of the first charging facility, a first lid provided at the first power receiving port, a first lid lock device configured to switch the first lid between a locked state and an unlocked state, and a controller configured to control the first lid lock device to a locked state or an unlocked state. When an entry door of the vehicle is locked while the first lid is closed, the controller is configured to set the first lid lock device to the locked state in synchronization with locking of the entry door. When the entry door of the vehicle is locked while the first lid is open, the controller is configured to set the first lid lock device to the unlocked state until the first external charging is started, set the first lid lock device to the locked state when the first external charging is started, and set the first lid lock device to the unlocked state when the first external charging completes.

With the above configuration, even when the entry door of the vehicle is locked, but when the first lid is open, the controller does not synchronize the first lid lock device with locking of the entry door. The controller sets the first lid lock device to the unlocked state until the first external charging is started, so a user is able to close the first lid at this stage. The controller sets the first lid lock device to the locked state when the first external charging is started, and sets the first lid lock device to the unlocked state when the first external charging completes. The first lid lock device is set to the unlocked state together with completion of the first external charging, so the user who has disconnected the first connector from the first power receiving port is able to close the first lid without any additional operation. Thus, it is possible to improve user convenience.

In one embodiment, the first power receiving port may be configured such that connection with the first connector is set to a locked state by a first connector lock device during the first external charging. The first connector lock device may be included in the first charging facility and may be configured to switch connection of the first connector with the first power receiving port between the locked state and an unlocked state. The first power receiving port may be configured such that, when the first external charging completes, connection with the first connector is set to the unlocked state by the first connector lock device.

With the above configuration, the first connector lock device that switches connection of the first connector with the first power receiving port between the locked state and the unlocked state is provided in the first charging facility. Then, connection of the first power receiving port with the first connector is set to the unlocked state together with completion of the first external charging. Thus, the user is able to disconnect the first connector from the first power receiving port without any additional operation after completion of the first external charging.

In one embodiment, the vehicle may further include a relay configured to switch between supply and interruption of operating power to the first lid lock device. The controller may be configured to control the first lid lock device to the locked state or the unlocked state by controlling the relay.

With the above configuration, the controller is able to control the first lid lock device by controlling the relay.

In one embodiment, the vehicle may be configured to be able to perform second external charging to charge the electrical storage device with electric power supplied from a second charging facility provided outside the vehicle. The vehicle may further include a second power receiving port configured to be able to connect with a second connector of the second charging facility, a second lid provided at the second power receiving port, a second lid lock device configured to switch the second lid between a locked state and an unlocked state, and a second connector lock device configured to switch connection of the second connector with the second power receiving port between a locked state and an unlocked state. The second lid lock device and the second connector lock device may be configured to receive operating power through the relay.

With the above configuration, the second lid lock device and the second connector lock device receive operating power through the relay as in the case of the first lid lock device. Since a relay does not need to be individually provided for each of the lock devices, a circuit for operating each of the lock devices is able to be made at low cost. In addition, since relays for operating the lock devices are integrated, when, for example, the first external charging is started, the second lid lock device is also set to the locked state. Thus, tampering to the second lid and the second power receiving port during the first external charging is reduced.

In one embodiment, the first external charging may be direct-current charging, and the second external charging may be alternating-current charging.

A second aspect of the disclosure provides a control method for a vehicle. The vehicle is configured to be able to perform first external charging to charge an in-vehicle electrical storage device with electric power supplied from a first charging facility provided outside the vehicle. The vehicle includes a first power receiving port configured to be able to connect with a first connector of the first charging facility, a first lid provided at the first power receiving port, a first lid lock device configured to switch the first lid between a locked state and an unlocked state, and a controller configured to control the first lid lock device to a locked state or an unlocked state. The control method includes when an entry door of the vehicle is locked while the first lid is closed, setting, by the controller, the first lid lock device to the locked state in synchronization with locking of the entry door, and, when the entry door of the vehicle is locked while the first lid is open, setting, by the controller, the first lid lock device to the unlocked state until the first external charging is started, setting, by the controller, the first lid lock device to the locked state when the first external charging is started, and setting, by the controller, to the unlocked state when the first external charging completes.

According to the aspects of the disclosure, it is possible to improve user convenience in external charging using a charging facility equipped with a connector lock device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
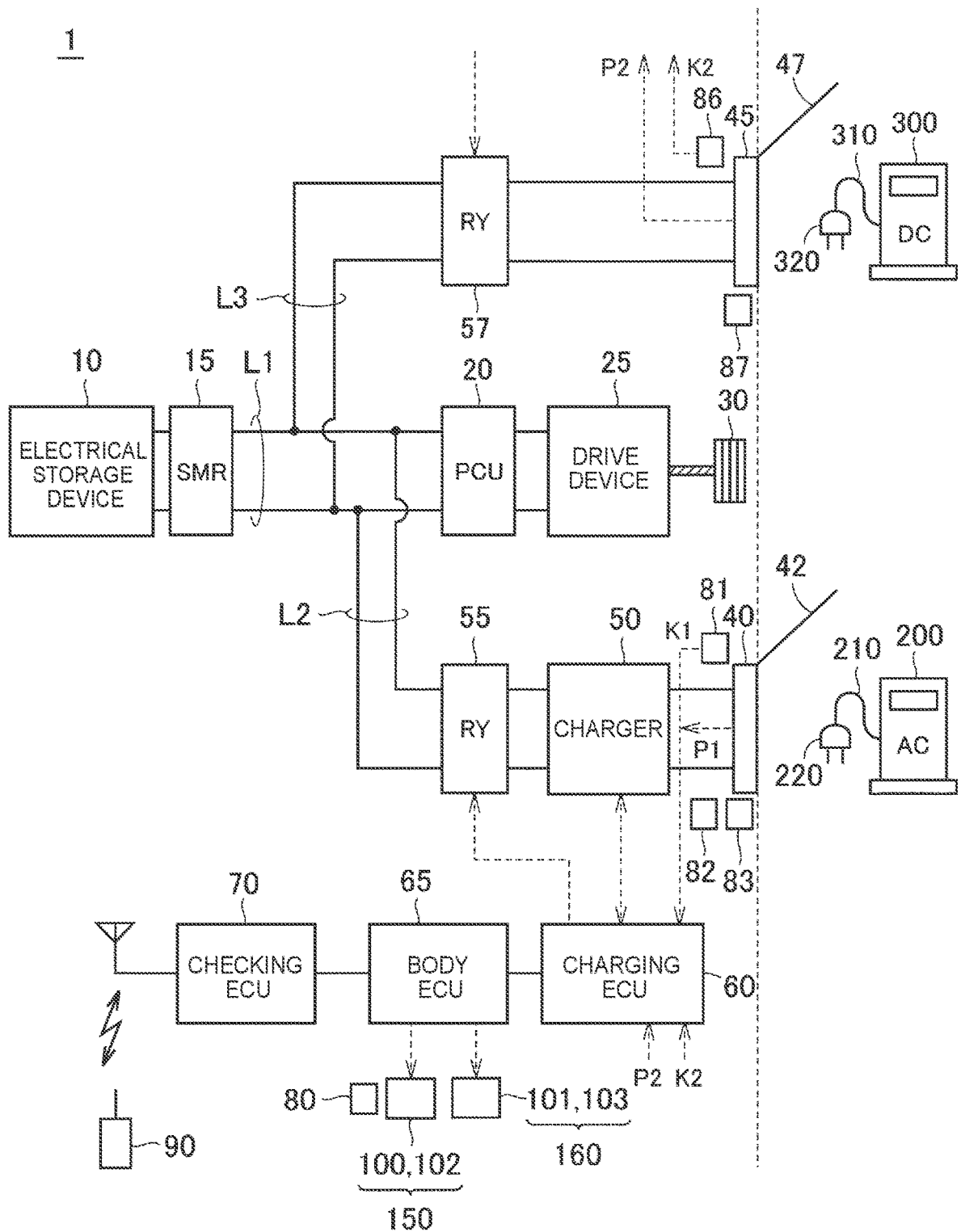
FIG. 1 is a diagram schematically showing an example of the overall configuration of a vehicle according to an embodiment of the disclosure.

Hereinafter, an embodiment of the disclosure will be described in detail with reference to the accompanying drawings. Like reference signs denote the same or corresponding portions in the drawings, and the description thereof will not be repeated.

Configuration of Vehicle

FIG. 1 is a diagram schematically showing an example of the overall configuration of a vehicle 1 according to an embodiment of the disclosure. As shown in FIG. 1, the vehicle 1 includes an electrical storage device 10, a system main relay (SMR) 15, a power control unit (PCU) 20, a drive device 25, and a drive wheel 30. The vehicle 1 is a battery electric vehicle that drives the drive wheel 30 with the drive device 25 by using electric power stored in the electrical storage device 10. The vehicle 1 is configured to be able to perform alternating-current (AC) charging to charge the electrical storage device 10 with alternating-current power supplied from an alternating-current (AC) charging facility 200 outside the vehicle 1 and direct-current (DC) charging to charge the electrical storage device 10 with direct-current power supplied from a direct-current (DC) charging facility 300 outside the vehicle 1. Examples of the vehicle 1 may include a plug-in hybrid electric vehicle further equipped with an engine, and a fuel cell electric vehicle further equipped with a fuel cell as a power supply in addition to the electrical storage device 10.

The electrical storage device 10 is a rechargeable electric power storage element. The electrical storage device 10 is configured to include, for example, a secondary battery, such as a lithium ion battery and a nickel-metal hydride battery, or an electrical storage element, such as an electrical double-layer capacitor. A lithium ion secondary battery is a secondary battery that uses lithium as a charge carrier. The lithium ion secondary battery can include not only a general lithium ion secondary battery of which the electrolyte is liquid but also a so-called all-solid battery that uses a solid electrolyte.

The SMR 15 is a relay provided between the electrical storage device 10 and power lines L1 and used to electrically connect the electrical storage device 10 to the power lines L1 or electrically separate the electrical storage device 10 from the power lines L1.

The PCU 20 is a collection of power conversion devices for driving the drive device 25 by receiving electric power from the electrical storage device 10. The PCU 20 includes, for example, an inverter that drives a motor included in the drive device 25, a converter that steps up electric power output from the electrical storage device 10, and the like.

The drive device 25 is a collection of devices for driving the drive wheel 30. The drive device 25 includes, for example, a motor, an engine, or the like that drives the drive wheel 30. The drive device 25 generates electric power during, for example, braking of the vehicle with the motor that drives the drive wheel 30 and outputs the generated electric power to the PCU 20.

The vehicle 1 further includes a power receiving port portion 40, an AC lid 42, a charger 50, and a charging relay 55 as components for performing AC charging. The power receiving port portion 40, as in the case of an existing fuel filling port, is made by forming a recess on the outer surface of the vehicle. An AC inlet 41 (FIG. 2) to which a connector 220 of a charging cable 210 connected to the AC charging facility 200 is able to be connected is provided at the power receiving port portion 40. The AC lid 42 is a lid for the power receiving port portion 40 and is provided at the power receiving port portion 40 with a coupling, such as a hinge, such that the AC lid 42 is able to be opened and closed.

A connector connection signal P1 that indicates a connection status between the AC inlet 41 and the connector 220 of the charging cable 210 is output from the power receiving port portion 40 to a charging electronic control unit (ECU) 60 (described later). The connector connection signal P1 is activated when, for example, the connector 220 is connected to the AC inlet 41.

A lid switch 81 that detects the open-closed state of the AC lid 42 is provided at the power receiving port portion 40. The lid switch 81 outputs a lid signal K1 that indicates the open-closed state of the AC lid 42 to the charging ECU 60. The lid signal K1 is activated when, for example, the AC lid 42 is closed.

A lid lock device 82 and a connector lock device 83 are further provided at the power receiving port portion 40. The lid lock device 82 is configured to switch the closed AC lid 42 between a locked state and an unlocked state. The connector lock device 83 is configured to switch connection of the connector 220 of the charging cable 210 with the AC inlet 41 between a locked state and an unlocked state. The configurations of the power receiving port portion 40, the lid lock device 82, and the connector lock device 83 will be described in detail later.

The charger 50 converts alternating-current power supplied from the AC charging facility 200 to the voltage level of the electrical storage device 10 and outputs the electric power in a state where the connector 220 of the AC charging facility 200 is connected to the AC inlet 41 of the power receiving port portion 40. The charger 50 is configured to include, for example, a power factor correction (PFC) circuit, an inverter, an isolation transformer, a rectifier circuit, and the like. The charging relay 55 is a relay used to electrically connect the charger 50 to power lines L2 connected to the power lines L1 or electrically separate the charger 50 from the power lines L2.

The vehicle 1 further includes a power receiving port portion 45, a DC lid 47, and a charging relay 57 as components for performing DC charging. The power receiving port portion 45, as in the case of an existing fuel filling port, is made by forming a recess on the outer surface of the vehicle. The power receiving port portion 45 has a configuration compliant with a charging standard of CHAdeMO (registered trademark) or GB/T. A DC inlet 46 (FIG. 3) to which a connector 320 of a charging cable 310 connected to the DC charging facility 300 is able to be connected is provided at the power receiving port portion 45. The DC lid 47 is a lid for the power receiving port portion 45 and is provided at the power receiving port portion 45 with a coupling, such a hinge, such that the DC lid 47 is able to be opened and closed.

A connector connection signal P2 that indicates a connection status between the DC inlet 46 and the connector 320 of the charging cable 310 is output from the power receiving port portion 45 to the charging ECU 60 (described later). The connector connection signal P2 is activated when, for example, the connector 320 is connected to the DC inlet 46.

A lid switch 86 that detects the open-closed state of the DC lid 47 is provided at the power receiving port portion 45. The lid switch 86 outputs a lid signal K2 that indicates the open-closed state of the DC lid 47 to the charging ECU 60. The lid signal K2 is activated when, for example, the DC lid 47 is closed.

A lid lock device 87 is further provided at the power receiving port portion 45. The lid lock device 87 is configured to switch the closed DC lid 47 between a locked state and an unlocked state. The configurations of the power receiving port portion 45 and the lid lock device 87 will be described in detail later.

The DC charging facility 300 according to the present embodiment is compliant with the charging standard of CHAdeMO or GB/T. Therefore, a connector lock device that switches connection of the connector 320 with the DC inlet 46 between a locked state and an unlocked state is provided in the DC charging facility 300. Therefore, the power receiving port portion 45 according to the present embodiment does not include a connector lock device.

The vehicle 1 further includes the charging ECU 60, a body ECU 65, a checking ECU 70, a door lock device 80, lock relays 100, 101, and unlock relays 102, 103. The lock relay 100 and the unlock relay 102 are accommodated in, for example, a relay box 150. The lock relay 101 and the unlock relay 103 are accommodated in, for example, a relay box 160.

Each of the charging ECU 60, the body ECU 65, and the checking ECU 70 is configured to include a central processing unit (CPU), a memory (random access memory (RAM) and a read only memory (ROM)), and an I/F device for inputting and outputting various signals (all are not shown). The CPU expands a program stored in the ROM on the RAM and runs the program. The program stored in the ROM describes a process that is executed by the CPU. The charging ECU 60, the body ECU 65, and the checking ECU 70 are connected through an in-vehicle network, such as a controller area network (CAN), and are able to exchange information with one another.

In the present embodiment, an example in which a control unit is divided into the charging ECU 60, the body ECU 65, and the checking ECU 70 will be described. Alternatively, any two or all of the charging ECU 60, the body ECU 65, and the checking ECU 70 may be made up of a single ECU.

The charging ECU 60 receives, from the power receiving port portion 40, the connector connection signal P1 that indicates the connection status between the connector 220 of the AC charging facility 200 and the AC inlet 41. The charging ECU 60 receives, from the lid switch 81, the lid signal K1 that indicates the open-closed state of the AC lid 42. The charging ECU 60 receives, from the power receiving port portion 45, the connector connection signal P2 that indicates the connection status between the connector 320 of the DC charging facility 300 and the DC inlet 46. The charging ECU 60 receives, from the lid switch 86, the lid signal K2 that indicates the open-closed state of the DC lid 47.

When the connector 220 of the AC charging facility 200 is connected to the AC inlet 41 and a predetermined preparation process for performing AC charging completes, the charging ECU 60 turns on the charging relay 55. The charging ECU 60 executes a predetermined computation process based on signals from various sensors and information stored in the memory, and performs AC charging by controlling the charger 50 based on the computation result. When the connector 320 of the DC charging facility 300 is connected to the DC inlet 46 and a predetermined preparation process for performing DC charging completes, the charging ECU 60 turns on the charging relay 57. Thus, DC charging is performed.

The checking ECU 70 executes control for allowing the door lock device 80 to lock or unlock an entry door (not shown) by performing wireless communication with a mobile terminal 90 owned by a user. Specifically, when the checking ECU 70 detects door lock operation by the user during a stop of the vehicle 1, the checking ECU 70 checks the ID of the mobile terminal 90. Examples of the door lock operation include an action that the user operates a door lock switch provided on the mobile terminal 90 and an action that the user touches a door lock sensor provided at a door knob.

When ID checking of the mobile terminal 90 is successful, the checking ECU 70 outputs a door lock command to the body ECU 65. The checking ECU 70 also checks the ID of the mobile terminal 90 when a door unlock operation by the user is detected, and outputs a door unlock command to the body ECU 65 when ID checking is successful.

The body ECU 65 controls the door lock device 80 based on a door lock command or a door unlock command received from the checking ECU 70. The door lock device 80 is configured to switch the entry door in a closed state between a locked state and an unlocked state. The lock relay 100 and the unlock relay 102 are provided in the door lock device 80. The lock relay 100 is a relay that switches supply and interruption of operating power for operating the door lock device 80 such that the entry door is set to a locked state. The unlock relay 102 is a relay that switches supply and interruption of operating power for operating the door lock device 80 such that the entry door is set to an unlocked state.

When the body ECU 65 receives a door lock command from the checking ECU 70, the body ECU 65 turns on the lock relay 100. Thus, the door lock device 80 operates, and the entry door is set to the locked state. When the body ECU 65 receives a door unlock command from the checking ECU 70, the body ECU 65 turns on the unlock relay 102. Thus, the door lock device 80 operates, and the entry door is set to the unlocked state.

As will be described in detail later, the integrated lid lock relay 101 and the integrated unlock relay 103 are provided for the lid lock device 82, the connector lock device 83, and the lid lock device 87. In other words, the lid lock device 82, the connector lock device 83, and the lid lock device 87 are configured to operate in synchronization with one another.

The lock relay 101 is a relay that switches between supply and interruption of operating power for operating the lid lock device 82 such that the AC lid 42 is set to the locked state, operating power for operating the connector lock device 83 such that connection of the AC inlet 41 with the connector 220 is set to the locked state, and operating power for operating the lid lock device 87 such that the DC lid 47 is set to the locked state. The unlock relay 103 is a relay that switches between supply and interruption of operating power for operating the lid lock device 82 such that the AC lid 42 is set to the unlocked state, operating power for operating the connector lock device 83 such that connection of the AC inlet 41 with the connector 220 is set to the unlocked state, and operating power for operating the lid lock device 87 such that the DC lid 47 is set to the unlocked state.

Figure 2:
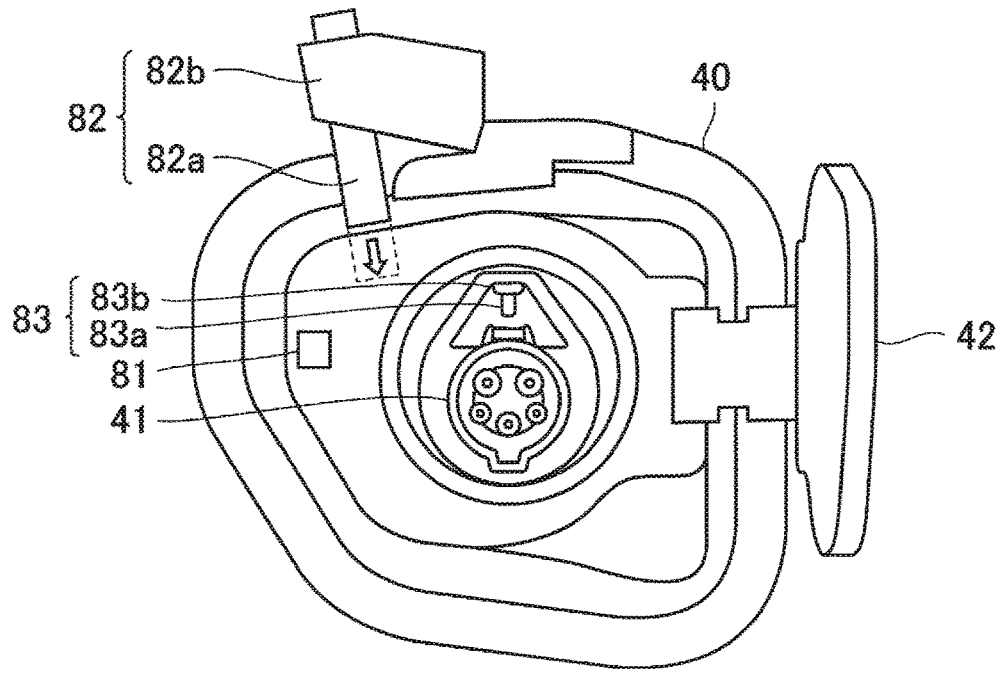
FIG. 2 is a view showing an example of the configuration of a power receiving port portion of an AC lid.

FIG. 2 is a view showing an example of the configuration of the power receiving port portion 40 shown in FIG. 1. As shown in FIG. 2, the AC inlet 41, the lid switch 81, the lid lock device 82, and the connector lock device 83 are provided at the power receiving port portion 40.

The AC inlet 41 is configured to be able to connect with the connector 220 of the charging cable 210. When the connector 220 is connected to the AC inlet 41, the connector connection signal P1 to be output to the charging ECU 60 is activated.

The lid switch 81 is configured to be able to detect the open-closed state o the AC lid 42. When the AC lid 42 is closed to depress the lid switch 81, the lid signal K1 to be output to the charging ECU 60 is activated.

The lid lock device 82 is configured to include, for example, a retractable lock pin 82a, and a drive device 82b that drives the lock pin 82a. When the lid lock device 82 projects the lock pin 82a from a position in an unlocked state, the lid lock device 82 is set to a locked state where the AC lid 42 is not openable. When the lid lock device 82 retracts the lock pin 82a from a position in the locked state, the lid lock device 82 is set to an unlocked state where the AC lid 42 is openable. The lid lock device 82 is operable regardless of the open-closed state of the AC lid 42, and is able to operate even when the AC lid 42 is open.

The connector lock device 83 is provided near the outer periphery of the AC inlet 41. The connector lock device 83 is configured to include, for example, a retractable lock pin 83a, and a drive device 83b that drives a lock pin 83a. When the connector lock device 83 projects the lock pin 83a from a position in an unlocked state, the connector lock device 83 is set to a locked state where the connector 220 of the charging cable 210 connected to the AC inlet 41 is not removable from the AC inlet 41. When the connector lock device 83 retracts the lock pin 83a from a position in the locked state, the connector lock device 83 is set to an unlocked state where the connector 220 is removable from the AC inlet 41. The connector lock device 83 is operable regardless of whether the connector 220 is connected to the AC inlet 41, and is able to operate even when the connector 220 is not connected to the AC inlet 41.

Figure 3:
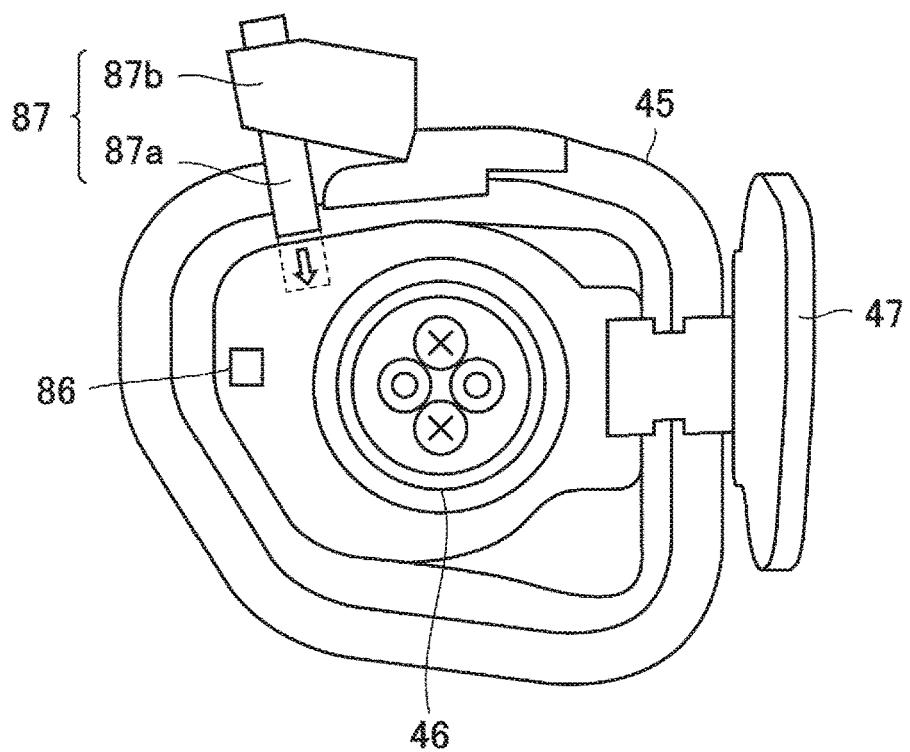
FIG. 3 is a view showing an example of the configuration of a power receiving port portion of a DC lid.

FIG. 3 is a view showing an example of the configuration of the power receiving port portion 45 shown in FIG. 1. As shown in FIG. 3, the DC inlet 46, the lid switch 86, and the lid lock device 82 are provided at the power receiving port portion 45.

The DC inlet 46 is configured to be able to connect with the connector 320 of the charging cable 310. When the connector 320 is connected to the DC inlet 46, the connector connection signal P2 to be output to the charging ECU 60 is activated.

The lid switch 86 is configured to be able to detect the open-closed state o the DC lid 47. When the DC lid 47 is closed to depress the lid switch 86, the lid signal K2 to be output to the charging ECU 60 is activated.

The lid lock device 87 is configured to include, for example, a retractable lock pin 87a, and a drive device 87b that drives the lock pin 82a. When the lid lock device 87 projects the lock pin 87a from a position in an unlocked state, the lid lock device 87 is set to a locked state where the DC lid 47 is not openable. When the lid lock device 87 retracts the lock pin 87a from a position in the locked state, the lid lock device 87 is set to an unlocked state where the DC lid 47 is openable. The lid lock device 87 is operable regardless of the open-closed state of the DC lid 47, and is able to operate even when the DC lid 47 is open.

Figure 4:
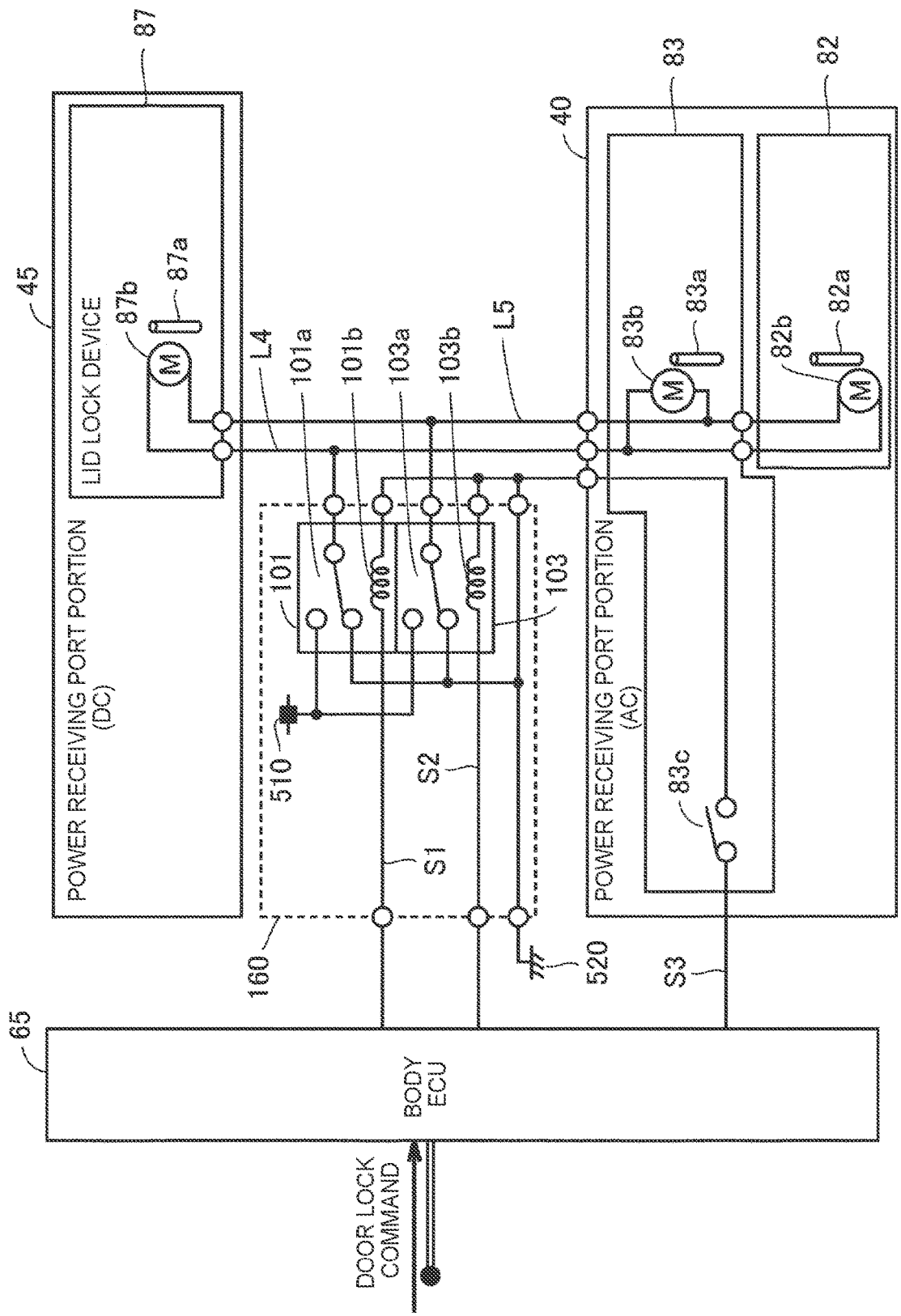
FIG. 4 is a diagram showing an example of the configuration of a circuit for operating a lid lock device, a connector lock device, and another connector lock device.

FIG. 4 is a diagram showing an example of the configuration of a circuit for operating the lid lock device 82, the connector lock device 83, and the lid lock device 87. In the vehicle 1 according to the present embodiment, the lid lock device 82, the connector lock device 83, and the lid lock device 87 are connected to the same relay box 160 and receive operating power through the relay box 160.

As shown in FIG. 4, the lock relay 101 includes a contact 101a and a coil 101b. The contact 101a operates to connect an electric line L4 to a power supply node 510 when the coil 101b is energized. The contact 101a operates to connect the electric line L4 to a body earth 520 when the coil 101b is de-energized. The coil 101b is connected to the body ECU 65 through a signal line S1. The coil 101b is switched between an energized state and a de-energized state by the body ECU 65. Hereinafter, a state where the electric line L4 is connected to the power supply node 510 is referred to as that the lock relay 101 is on, and a state where the electric line L4 is connected to the body earth 520 is referred to as that the lock relay 101 is off.

The unlock relay 103 includes a contact 103*a* and a coil 103*b*. The contact 103*a* operates to connect an electric line L5 to the power supply node 510 when the coil 103*b* is energized. The contact 103*a* operates to connect the electric line L5 to the body earth 520 when the coil 103*b* is de-energized. The coil 103*b* is connected to the body ECU 65 through a signal line S2. The coil 103*b* is switched between an energized state and a de-energized state by the body ECU 65. Hereinafter, a state where the electric line L5 is connected to the power supply node 510 is referred to as that the unlock relay 103 is on, and a state where the electric line L5 is connected to the body earth 520 is referred to as that the unlock relay 103 is off.

The lid lock device 82, the connector lock device 83, and the lid lock device 87 are connected between the electric line L4 and the electric line L5 in parallel with one another.

The lid lock device 82 includes the lock pin 82*a* and the drive device 82*b* as described above. The drive device 82*b* includes, for example a motor and is connected between the electric line L4 and the electric line L5. The motor included in the drive device 82*b* rotates in the forward direction when current (lock current) flows from the electric line L4 through the motor to the electric line L5, and rotates in the reverse direction when current (unlock current) flows from the electric line L5 through the motor to the electric line L4. When the motor rotates in the forward direction, the drive device 82*b* projects the lock pin 82*a* to shift the lid lock device 82 from the unlocked state to the locked state. When the motor rotates in the reverse direction, the drive device 82*b* retracts the lock pin 82*a* to shift the lid lock device 82 from the locked state to the unlocked state.

The connector lock device 83 includes the lock pin 83*a* and the drive device 83*b* as described above. The drive device 83*b* includes, for example a motor and is connected between the electric line L4 and the electric line L5. The motor included in the drive device 83*b* rotates in the forward direction when current (lock current) flows from the electric line L4 through the motor to the electric line L5, and rotates in the reverse direction when current (unlock current) flows from the electric line L5 through the motor to the electric line L4. When the motor rotates in the forward direction, the drive device 83*b* projects the lock pin 83*a* to shift the connector lock device 83 from the unlocked state to the locked state. When the motor rotates in the reverse direction, the drive device 83*b* retracts the lock pin 83*a* to shift the connector lock device 83 from the locked state to the unlocked state.

The connector lock device 83 may further include a lock detection switch 83*c* that detects a shift of the connector lock device 83 to the locked state. The lock detection switch 83*c* is connected to the body ECU 65 through a signal line S3. The lock detection switch 83*c* is, for example, pushed by the lock pin 83*a* having shifted to the position in the locked state and is set to an on state. When, for example, the lock pin 83*a* shifts from the position in the locked state to the position in the unlocked state, the lock detection switch 83*c* is not pushed by the lock pin 83*a* any more and is set to an off state. The body ECU 65, for example, detects the state of the connector lock device 83 based on the voltage level of the signal line S3.

The lid lock device 87 includes the lock pin 87*a* and the drive device 87*b* as described above. The drive device 87*b* includes, for example a motor and is connected between the electric line L4 and the electric line L5. The motor included in the drive device 87*b* rotates in the forward direction when current (lock current) flows from the electric line L4 through the motor to the electric line L5, and rotates in the reverse direction when current (unlock current) flows from the electric line L5 through the motor to the electric line L4. When the motor rotates in the forward direction, the drive device 87*b* projects the lock pin 87*a* to shift the lid lock device 87 from the unlocked state to the locked state. When the motor rotates in the reverse direction, the drive device 87*b* retracts the lock pin 87*a* to shift the lid lock device 87 from the locked state to the unlocked state.

In the vehicle 1 according to the present embodiment, for lock operation, the lid lock device 82, the connector lock device 83, and the lid lock device 87 receive operating power from the same lock relay 101. For unlock operation, the lid lock device 82, the connector lock device 83, and the lid lock device 87 receive operating power from the same unlock relay 103.

Synchronization and Non-Synchronization with Door Lock Command or Door Unlock Command In the vehicle 1 according to the present embodiment, the body ECU 65 determines whether to synchronize control over the relay box 160 with a door lock command and a door unlock command based on the open-closed state of the DC lid 47. The body ECU 65 detects the open-closed state of the DC lid 47 based on the lid signal K2 received via the charging ECU 60.

When the DC lid 47 is in a closed state, the body ECU 65 controls the relay box 160 (the lock relay 101 and the unlock relay 103) in synchronization with the door lock command or the door unlock command. When the body ECU 65 receives the door lock command in a state where the DC lid 47 is closed (closed state), the body ECU 65 turns on the lock relay 101 in addition to the lock relay 100. Specifically, the body ECU 65 turns on the lock relay 100 and turns off the unlock relay 102 in response to the door lock command, and turns on the lock relay 101 and turns off the unlock relay 103. Thus, the door lock device 80 is set to the locked state, and the lid lock device 82, the connector lock device 83, and the lid lock device 87 are also set to the locked state.

When the body ECU 65 receives the door unlock command in a state where the DC lid 47 is closed (closed state), the body ECU 65 turns on the unlock relay 103 in addition to the unlock relay 102. Specifically, the body ECU 65 turns off the lock relay 100 and turns on the unlock relay 102 in response to the door unlock command, and turns off the lock relay 101 and turns on the unlock relay 103. Thus, the door lock device 80 is set to the unlocked state, and the lid lock device 82, the connector lock device 83, and the lid lock device 87 are also set to the unlocked state.

When the DC lid 47 is in an open state, the body ECU 65 does not synchronize control over the relay box 160 with the door lock command. When the body ECU 65 receives the door lock command in a state where the DC lid 47 is open (open state), the body ECU 65 turns on the lock relay 100 and turns off the unlock relay 102 in response to the door lock command, and maintains the lock relay 101 in an off state and the unlock relay 103 in an off state until the start of DC charging. Then, when DC charging is started, until DC charging completes (that is, during DC charging), the body ECU 65 turns on the lock relay 101 and turns off the unlock relay 103. After that, when DC charging completes, the body ECU 65 turns off the lock relay 101 and turns on the unlock relay 103. Thus, the door lock device 80 is set to the locked state in response to the door lock command, and the lid lock device 82, the connector lock device 83, and the lid lock device 87 are set to the locked state only during DC charging. By setting the lid lock device 82, the connector lock device 83, and the lid lock device 87 to the locked state during DC charging, tampering to the AC lid 42 and the power receiving port portion 40 during DC charging is reduced.

When a shift of the lid lock device 82, the connector lock device 83, and the lid lock device 87 to the locked state or the unlocked state completes, the body ECU 65 turns off the lock relay 101 and turns off the unlock relay 103 and maintains the position of the locked state or the position of the unlocked state of each of the lock pins 82a, 83a, 87a of the lid lock device 82, the connector lock device 83, and the lid lock device 87.

Timing Chart

Figure 5:
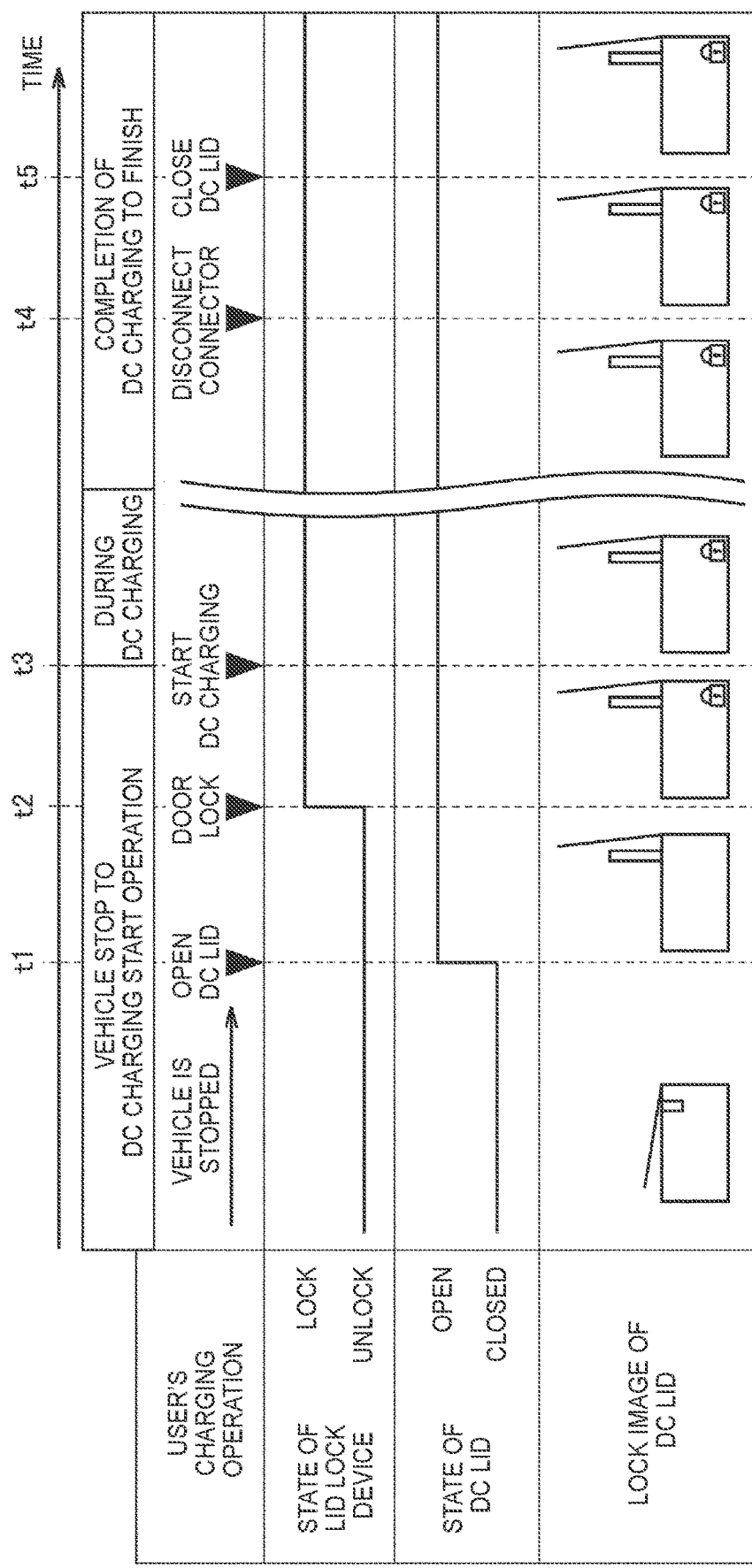
FIG. 5 is a timing chart of a comparative example.

FIG. 5 is a timing chart of a comparative example. With the above configuration, it is possible to avoid a situation as in the case of the comparative example described below. It is assumed that, in a vehicle according to the comparative example, the lock relays of the door lock device 80, the lid lock device 82, the connector lock device 83, and the lid lock device 87 are integrated, and the unlock relays of the door lock device 80, the lid lock device 82, the connector lock device 83, and the lid lock device 87 are integrated. In the vehicle according to the comparative example, the lock relay and the unlock relay are controlled in response to a door lock command and a door unlock command. In other words, in the vehicle according to the comparative example, the door lock device 80, the lid lock device 82, the connector lock device 83, and the lid lock device 87 are controlled so as co be constantly in synchronization with one another.

As shown in FIG. 5, FIG. 5 shows a user's operation related to DC charging (charging operation), the state of the lid lock device 87, the open-closed state of the DC lid 47, and a lock image of the DC lid 47.

Initially, it is assumed that the vehicle is stopped in a state where the DC lid 47 is closed. At time t1, the DC lid 47 is opened by a user. Then, the user connects the connector 420 of the DC charging facility 300 to the DC inlet 46, and, at time t2, performs door lock operation for locking the entry door. As a result of the door lock operation, the checking ECU 70 sends a door lock command to the body ECU 65. The body ECU 65 shifts not only the door lock device 80 but also the lid lock device 82, the connector lock device 83, and the lid lock device 87 into the locked state in response to the door lock command. Therefore, the lock pin 87a of the lid lock device 87 projects, and the DC lid 47 is not able to be closed due to the projected lock pin 87a.

At time t3, the user performs start operation for starting DC charging. Thus, the connector lock device of the DC charging facility 300 operates, and connection of the DC inlet 46 with the connector 320 is set to the locked state.

At time t4, when DC charging completes, connection of the DC inlet 46 with the connector 320 is set to the unlocked state, and the connector 320 is removed from the DC inlet 46.

At time t5, the user attempts to close the DC lid 47. However, since the lid lock device 87 is in the locked state, operation to close the DC lid 47 is blocked by the lock pin 87a, and the user is not able to close the DC lid 47. To set the lid lock device 87 to the unlocked state, operation for unlocking the entry door is needed. An additional operation is needed to close the DC lid 47, which may impair user convenience.

Figure 6:
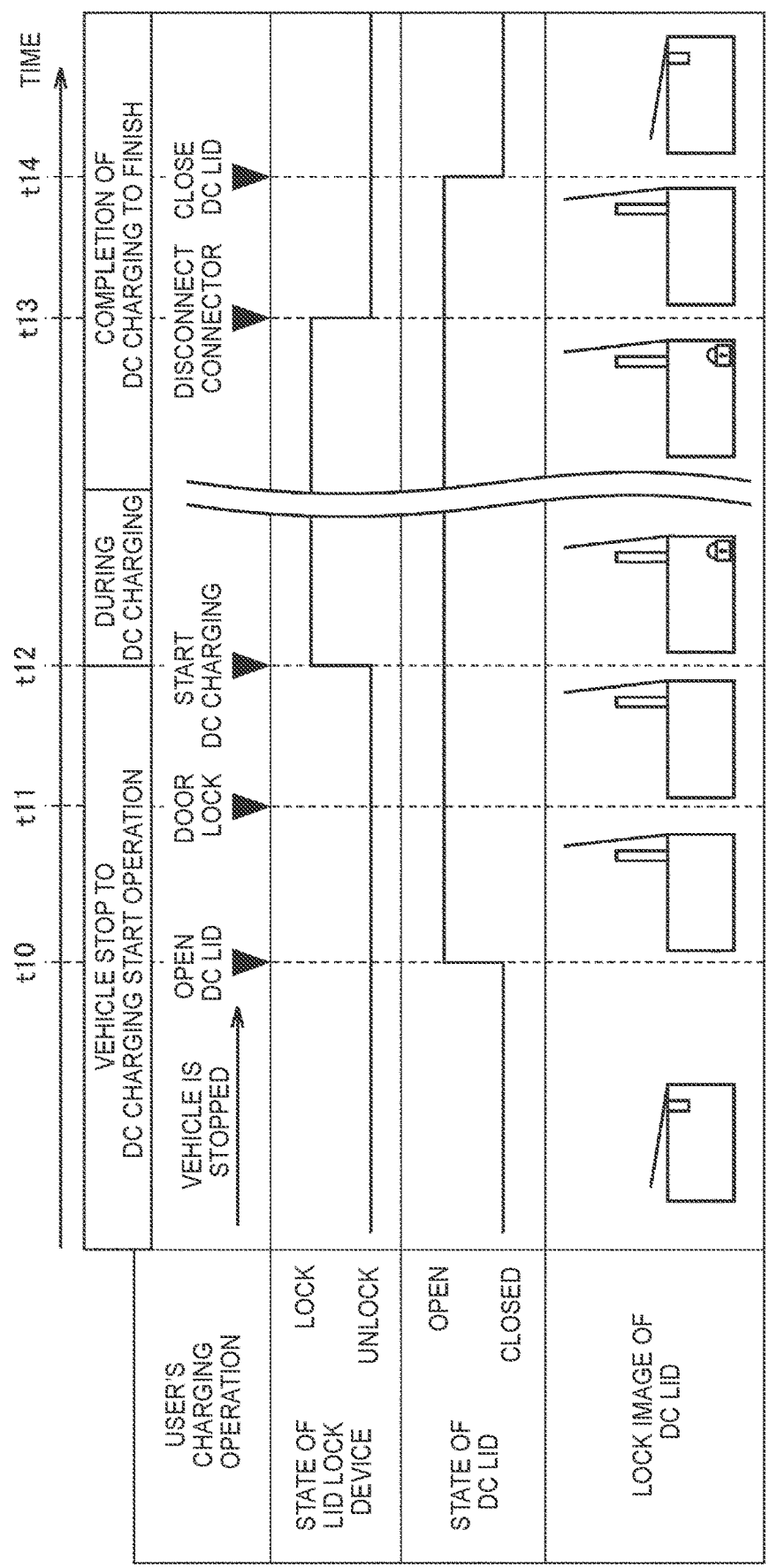
FIG. 6 is a timing chart of the present embodiment.

FIG. 6 is a timing chart of the present embodiment. FIG. 6, as in the case of FIG. 5, shows user's operation related to DC charging (charging operation), the state of the lid lock device 87, the open-closed state of the DC lid 47, and a lock image of the DC lid 47.

Initially, it is assumed that the vehicle 1 is stopped in a state where the DC lid 47 is closed. At time t10, the DC lid 47 is opened by a user. Then, the user connects the connector 420 of the DC charging facility 300 to the DC inlet 46, and, at time t11, performs door lock operation for locking the entry door. As a result of the door lock operation, the checking ECU 70 sends a door lock command to the body ECU 65. The body ECU 65 shifts the door lock device into a locked state in response to the door lock command. However, the body ECU 65 maintains the lid lock device 82, the connector lock device 83, and the lid lock device 87 in the unlocked state. In other words, the lid lock device 87 does not shift into the locked state through door lock operation. Therefore, at this stage, the user is able to close the DC lid 47.

At time t12, the user performs start operation for starting DC charging. Thus, the body ECU 65 shifts the lid lock device 82, the connector lock device 83, and the lid lock device 87 into the locked state. In addition, the connector lock device (not shown) of the DC charging facility 300 operates, and connection of the DC inlet 46 with the connector 320 is set to the locked state. During DC charging, the lid lock device 82 is also set to the locked state. Thus, the AC lid 42 is not able to be opened during DC charging, so tampering to the AC lid 42 and the power receiving port portion 40 during DC charging is reduced.

At time t13, DC charging completes. As a result of completion of DC charging, the connector lock device (not shown) of the DC charging facility 300 operates, and connection of the DC inlet 46 with the connector 320 is set to the unlocked state. Then the user disconnects the connector 320 from the DC inlet 46.

As a result of completion of DC charging, the body ECU 65 shifts the lid lock device 82, the connector lock device 83, and the lid lock device 87 into the unlocked state. Thus, the user who has disconnected the connector 320 from the DC inlet 46 is able to close the DC lid 47 at time t14.

Flowchart

Figure 7:
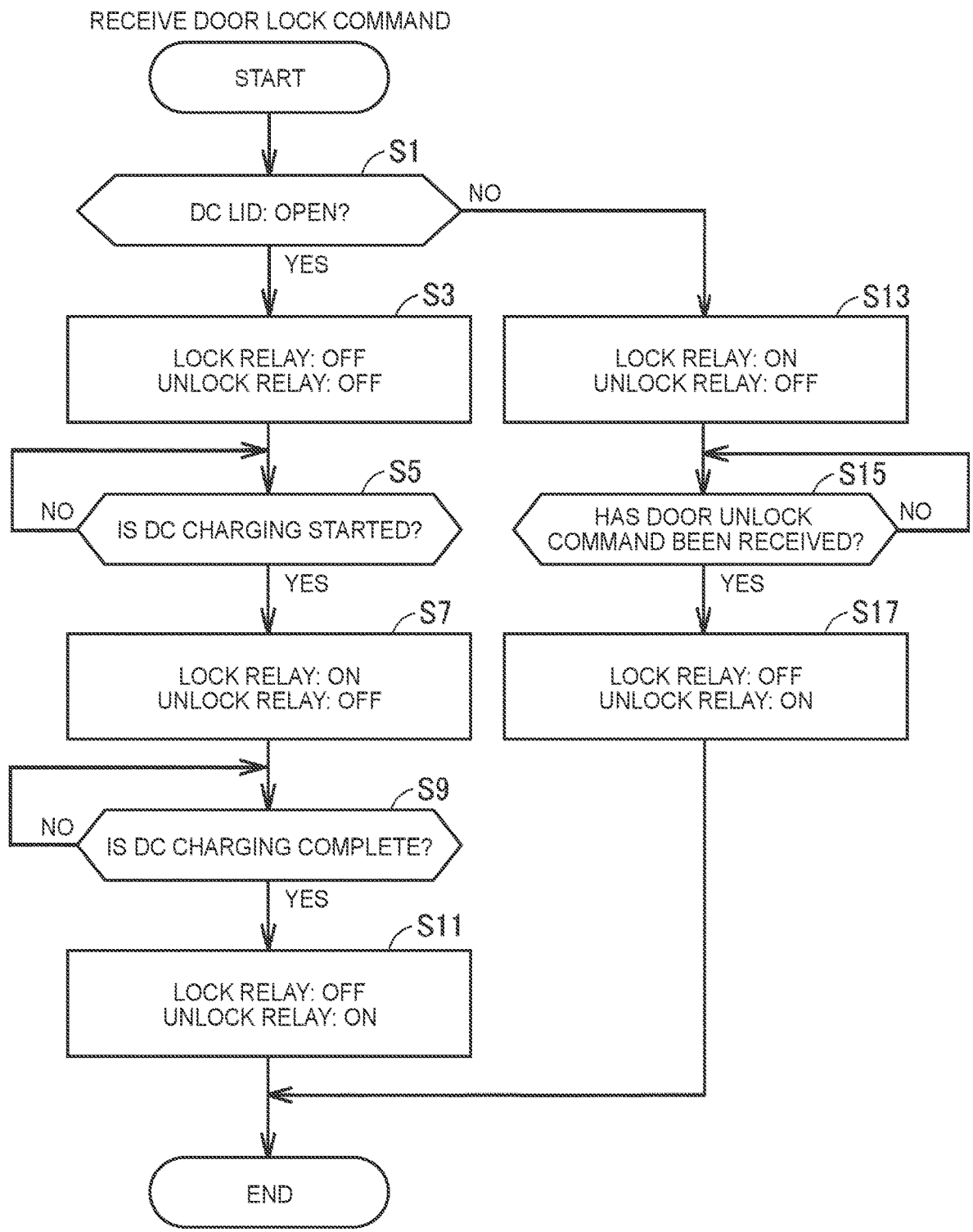
FIG. 7 is a flowchart showing an example of the procedure of a process that is executed in response to a door lock command.

FIG. 7 is a flowchart showing an example of the procedure of a process that is executed in response to a door lock command. The process of the flowchart is started by the body ECU 65 when the body ECU 65 receives a door lock command from the checking ECU 70. The steps (hereinafter, step is abbreviated as "S") of the flowchart shown in FIG. 7 will be described when implemented by software processing on the body ECU 65. Alternatively, one or some or all of the steps may be implemented by hardware (electrical circuit) created in the body ECU 65.

In S1, the body ECU 65 determines whether the DC lid 47 is open based on a detection result of the lid switch 86. The body ECU 65 may receive the lid signal K2 via the charging ECU 60 and determine whether the DC lid 47 is open based on the lid signal K2 or may determine whether the DC lid 47 is open based on the open-closed state of the DC lid 47, determined by the charging ECU 60 that has received the lid signal K2 from the lid switch 86. When the body ECU 65 determines that the DC lid 47 is open (YES in S1), the process proceeds to S3. When the body ECU 65 determines that the DC lid 47 is not open (NO in S1), the process proceeds to S13.

In S3, the body ECU 65 maintains the lock relay 101 and the unlock relay 103 in an off state. In other words, the body ECU 65 maintains the lid lock device 82, the connector lock device 83, and the lid lock device 87 in an unlocked state.

The body ECU 65 turns on the lock relay 100 and turns off the unlock relay 102 in response to a door lock command to set the door lock device 80 to the locked state and locks the entry door.

In S5, the body ECU 65 determines whether DC charging is started. Whether DC charging is started is transmitted from the charging ECU 60 to the body ECU 65. When, for example, a charge start button provided at the DC charging facility 300 is depressed by the user, communication is established between the DC charging facility 300 and the charging ECU 60. The body ECU 65 may detect the start of DC charging as a result of the established communication transmitted from the charging ECU 60 to the body ECU 65. When the body ECU 65 determines that DC charging is not started (NO in S5), the body ECU 65 waits for the start of DC charging. Before DC charging is started, the user is able to close the DC lid 47. When the body ECU 65 determines that DC charging is started (YES in S5), the process proceeds to S7.

In S7, the body ECU 65 turns on the lock relay 101 and turns off the unlock relay 103 to set the lid lock device 82, the connector lock device 83, and the lid lock device 87 to the locked state. Thus, during DC charging, the lid lock device 82 of the AC lid 42 is also set to the locked state, so it is not possible to open the AC lid 42. Thus, tampering to the AC lid 42 and the power receiving port portion 40 during DC charging is reduced.

In S9, the body ECU 65 determines whether DC charging is complete. DC charging is stopped when the condition is satisfied. The condition may be, for example, at least any one of a condition that the electrical storage device 10 is fully charged, a condition that the state of charge (SOC) of the electrical storage device 10 has reached a set SOC, a condition that a set charging time has elapsed, and a condition that a charge stop button provided at the DC charging facility 300 is depressed. The body ECU 65 waits for completion of DC charging (NO in S9). When DC charging completes (YES in S9), the body ECU 65 proceeds with the process to S11.

In S11, the body ECU 65 turns off the lock relay 101 and turns on the unlock relay 103 to set the lid lock device 82, the connector lock device 83, and the lid lock device 87 to the unlocked state. Thus, the user disconnects the connector 320 from the DC inlet 46 and is able to close the DC lid 47.

In S13, the body ECU 65 turns on the lock relay 101 and turns off the unlock relay 103 to set the lid lock device 82, the connector lock device 83, and the lid lock device 87 to the locked state. When the DC lid 47 is not open, it is assumed that DC charging is not performed. The body ECU 80 sets the lid lock device 82, the connector lock device 83, and the lid lock device 87 to the locked state in synchronization with the door lock command. The body ECU 65 turns on the lock relay 100 and turns off the unlock relay 102 in response to the door lock command to set the door lock device 80 to the locked state.

In S15, the body ECU 65 determines whether a door unlock command is received from the checking ECU 70. When the body ECU 65 determines that a door unlock command is not received (NO in S15), the body ECU 65 waits for receiving a door unlock command. When the body ECU 65 determines that a door unlock command is received (YES in S15), the process proceeds to S17.

In S17, the body ECU 65 turns off the lock relay 101 and turns on the unlock relay 103 to set the lid lock device 82, the connector lock device 83, and the lid lock device 87 to the unlocked state. The body ECU 65 turns off the lock relay 100 and turns on the unlock relay 102 in response to the door unlock command to set the door lock device 80 to the unlocked state.

As described above, in the vehicle 1 according to the present embodiment, when the DC lid 47 is in a closed state, control over the relay box 160 (the lock relay 101 and the unlock relay 103) is synchronized with a door lock command, while, when the DC lid 47 is in an open state, control over the relay box 160 (the lock relay 101 and the unlock relay 103) is not synchronized with a door lock command. When the DC lid 47 is in a closed state, it is assumed that DC charging is not performed. In this case, by collectively shifting the door lock device 80, the lid lock device 82, the connector lock device 83, and the lid lock device 87 into the locked state in response to door lock operation, it is possible to improve user convenience.

On the other hand, when the DC lid 47 is in an open state, it is assumed that DC charging is performed. In this case, when control over the relay box 160 is synchronized with a door lock command, an additional operation for closing the DC lid 47 (operation for unlocking the entry door) is needed after completion of DC charging, so user convenience is decreased. Therefore, it is possible to suppress a decrease in user convenience by not synchronizing control over the relay box 160 with a door lock command.

In the vehicle 1 according to the present embodiment, when the DC lid 47 is in an open state, the lid lock device 87 is set to the unlocked state until DC charging is started, the lid lock device 87 is set to the locked state during DC charging, and the lid lock device 87 is set to the unlocked state when DC charging completes. Since the lid lock device 87 is set to the unlocked state when DC charging completes, the user is able to close the DC lid 47 without any additional operation.

During DC charging, the lid lock device 82 is also set to the locked state. In other words, the AC lid 42 is not able to be opened during DC charging, so tampering to the AC lid 42 and the power receiving port portion 40 during DC charging is reduced.

In the vehicle 1 according to the present embodiment, relays that switch between supply and interruption of operating power to each of the lid lock device 82, the connector lock device 83, and the lid lock device 87 are integrated. Therefore, a relay that switches between supply and interruption of operating power to each of the lid lock device 82, the connector lock device 83, and the lid lock device 87 does not need to be individually provided, so a circuit is able to be made at low cost.

Modification

In the embodiment, the example in which each of the lid lock device 82, the connector lock device 83, and the lid lock device 87 includes the lock pin and the drive device as its mechanism has been described. However, the mechanism of each of the lid lock device 82, the connector lock device 83, and the lid lock device 87 is not limited thereto. Various known mechanisms may be applied to each of the lid lock device 82, the connector lock device 83, and the lid lock device 87.

The embodiment described above is illustrative and not restrictive in all respects. The scope of the disclosure is not defined by the description of the above-described embodiment, and is defined by the appended claims. The scope of the disclosure is intended to encompass all modifications within the scope of the appended claims and equivalents thereof

What is claimed is:

1. A vehicle configured to be able to perform first external charging to charge an in-vehicle electrical storage device with electric power supplied from a first charging facility provided outside the vehicle, the vehicle comprising:
    a first power receiving port configured to be able to connect with a first connector of the first charging facility;
    a first lid provided at the first power receiving port;
    a first lid lock device configured to switch the first lid between a locked state and an unlocked state; and
    a controller configured to control the first lid lock device to a locked state or an unlocked state, wherein:
    when an entry door of the vehicle is locked while the first lid is closed, the controller is configured to set the first lid lock device to the locked state in synchronization with locking of the entry door; and
    when the entry door of the vehicle is locked while the first lid is open, the controller is configured to
        set the first lid lock device to the unlocked state until the first external charging is started,
        set the first lid lock device to the locked state when the first external charging is started, and
        set the first lid lock device to the unlocked state when the first external charging completes.

2. The vehicle according to claim 1, wherein:
    the first power receiving port is configured such that connection with the first connector is set to a locked state by a first connector lock device during the first external charging;
    the first connector lock device is included in the first charging facility and is configured to switch connection of the first connector with the first power receiving port between the locked state and an unlocked state; and
    the first power receiving port is configured such that, when the first external charging completes, connection with the first connector is set to the unlocked state by the first connector lock device.

3. The vehicle according to claim 2, further comprising a relay configured to switch between supply and interruption of operating power to the first lid lock device, wherein
    the controller is configured to control the first lid lock device to the locked state or the unlocked state by controlling the relay.

4. The vehicle according to claim 3, configured to be able to perform second external charging to charge the electrical storage device with electric power supplied from a second charging facility provided outside the vehicle, the vehicle further comprising:
    a second power receiving port configured to be able to connect with a second connector of the second charging facility;
    a second lid provided at the second power receiving port;
    a second lid lock device configured to switch the second lid between a locked state and an unlocked state; and
    a second connector lock device configured to switch connection of the second connector with the second power receiving port between a locked state and an unlocked state, wherein
    the second lid lock device and the second connector lock device are configured to receive operating power through the relay.

5. The vehicle according to claim 4, wherein the first external charging is direct-current charging, and the second external charging is alternating-current charging.

6. A control method for a vehicle configured to be able to perform first external charging to charge an in-vehicle electrical storage device with electric power supplied from a first charging facility provided outside the vehicle, the vehicle including a first power receiving port configured to be able to connect with a first connector of the first charging facility, a first lid provided at the first power receiving port, a first lid lock device configured to switch the first lid between a locked state and an unlocked state, and a controller configured to control the first lid lock device to a locked state or an unlocked state, the control method comprising:
    when an entry door of the vehicle is locked while the first lid is closed, setting, by the controller, the first lid lock device to the locked state in synchronization with locking of the entry door; and
    when the entry door of the vehicle is locked while the first lid is open, setting, by the controller, the first lid lock device to the unlocked state until the first external charging is started, setting, by the controller, the first lid lock device to the locked state when the first external charging is started, and setting, by the controller, the first lid lock device to the unlocked state when the first external charging completes.

* * * * *